United States Patent
Begon et al.

(10) Patent No.: US 8,814,351 B2
(45) Date of Patent: Aug. 26, 2014

(54) IMPACT-RESISTANT OPHTHALMIC LENS AND ITS MANUFACTURING PROCESS

(75) Inventors: Cedric Begon, Charenton-le-Pont (FR); Aude Lapprand, Charenton-le-Pont (FR); Yves LeClaire, Charenton-le-Pont (FR); Yu Liu, Charenton-le-Pont (FI); Christelle Marck, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 110 days.

(21) Appl. No.: 13/325,078

(22) Filed: Dec. 14, 2011

(65) Prior Publication Data

US 2012/0147322 A1  Jun. 14, 2012

(30) Foreign Application Priority Data

Dec. 14, 2010  (FR) .................................... 10 60463

(51) Int. Cl.
*G02C 3/00* (2006.01)
(52) U.S. Cl.
USPC .................................................... 351/159.57
(58) Field of Classification Search
USPC ............... 351/159.01, 159.57, 159.6, 159.73, 351/159.74, 159.75
See application file for complete search history.

(56) References Cited

U.S. PATENT DOCUMENTS

| | | | |
|---|---|---|---|
| 5,128,388 A | 7/1992 | Komori et al. | |
| 5,316,791 A | 5/1994 | Farber et al. | |
| 5,619,288 A | 4/1997 | White, Jr. et al. | |
| 6,858,305 B2 | 2/2005 | Degand et al. | |
| 7,357,503 B2 | 4/2008 | Mosse et al. | |
| 7,581,832 B2 | 9/2009 | Begon | |
| 8,002,925 B2 | 8/2011 | Biteau et al. | |
| 2008/0304008 A1* | 12/2008 | Muisener et al. | 351/159 |
| 2011/0146893 A1 | 6/2011 | Marty | |

FOREIGN PATENT DOCUMENTS

| | | |
|---|---|---|
| EP | 0 614 957 | 9/1994 |
| EP | 2 018 262 | 1/2009 |
| FR | 2 897 693 | 8/2007 |
| FR | 2 902 105 | 12/2007 |
| WO | 97/35216 | 9/1997 |
| WO | 0200561 A2 | 1/2002 |

OTHER PUBLICATIONS

French Search Report dated Jul. 22, 2011, corresponding to Foreign Priority Application No. 10 60463.

* cited by examiner

*Primary Examiner* — James Greece
(74) *Attorney, Agent, or Firm* — Young & Thompson

(57) ABSTRACT

An ophthalmic lens includes: a transparent ophthalmic lens substrate made of organic glass; an adhesive layer covering at least one of the faces of the transparent substrate; a transparent film made of a thermoplastic polymer fixed to the transparent substrate via the adhesive layer; and an abrasion-resistant coating covering the transparent thermoplastic polymer film, characterized in that the ophthalmic lens has a minimum thickness at the center of less than 2 mm, preferably less than 1.5 mm and even more preferably less than 1.2 mm. Two processes for manufacturing such a lens and the use of an adhesive multilayer film to improve the impact strength of such a lens are also described.

18 Claims, No Drawings

IMPACT-RESISTANT OPHTHALMIC LENS AND ITS MANUFACTURING PROCESS

The present invention relates to a very thin ophthalmic lens comprising a transparent substrate, an adhesive layer, a thermoplastic film and an abrasion-resistant coating, said lens exhibiting excellent impact strength. The invention also relates to two processes for manufacturing such a lens.

Finally, the invention relates to the use of a multilayer film for improving the impact strength of an ophthalmic lens and especially of a very thin ophthalmic lens.

Abrasion-resistant varnishes are known for undesirably reducing the impact strength of organic ophthalmic lenses. One approach for solving this problem has consisted in interposing, between the organic lens and the abrasion-resistant varnish, an elastomeric primer layer (see for example U.S. Pat. No. 6,858,305 and U.S. Pat. No. 7,357,503). This primer, deposited in the form of a liquid composition and then optionally cross linked, not only absorbs the impacts received by the abrasion-resistant varnish but also ensures good adhesion of the abrasive varnish to the substrate. Its thickness is generally between 1 and about 20 μm.

For very thin lenses which, at certain places, have thicknesses of only of the order of 1 mm, the impact resistance of such bilayer (elastomeric primer+abrasion-resistant varnish) systems is however insufficient. It is in fact impossible to increase the thickness of the elastomeric primer beyond a certain limit, as otherwise lenses that scatter, unacceptable in the ophthalmic field, are obtained.

The applicant, in the context of its research aimed at developing ever thinner lenses, has discovered that it is possible for known bilayer systems, formed by an abrasion-resistant coating on an elastomeric primer to be advantageously replaced with a composite transparent film, hereafter also called an impact-resistant film, consisting of a transparent thermoplastic film and an abrasion-resistant coating applied to one of the faces of the thermoplastic film.

This impact-resistant composite film, when it is bonded to the organic substrate of the ophthalmic lens via an adhesive layer, gives the assembly a remarkably high impact strength. This increase in the impact strength is so considerable that it makes it possible to manufacture thin impact-resistant ophthalmic lenses having central thicknesses of only about 1 mm.

In other words, the advantages afforded by the bonding of the impact-resistant film are particularly substantial in the case of very thin ophthalmic lenses, preferably negative-dioptre ophthalmic lenses, having very small thicknesses at the centre and more particularly ophthalmic lenses having a minimum thickness at the centre of less than 2 mm, preferably less than 1.5 mm and even more preferably less than 1.2 mm, this thickness encompassing both the organic substrate and the multilayer film(s) bonded thereto.

As a consequence, one subject of the present invention is an ophthalmic lens comprising:
 (a) a transparent ophthalmic lens substrate made of organic glass;
 (b) an adhesive layer covering at least one of the faces of the transparent substrate;
 (c) a transparent film made of a thermoplastic polymer fixed to the transparent substrate via the adhesive layer; and
 (d) an abrasion-resistant coating covering the transparent thermoplastic polymer film,
characterized in that the ophthalmic lens has a minimum thickness at the centre of less than 2 mm, preferably less than 1.5 mm and even more preferably less than 1.2 mm.

Another subject of the present invention is two processes for manufacturing such an ophthalmic lens. The two processes, described in detail below, differ from each other essentially by the fact that, in one of the processes, the adhesive layer is firstly applied on one of the faces of the transparent film covered with the abrasion-resistant coating, whereas in the second process the adhesive layer is applied on the substrate. The substrate covered with the adhesive layer then receives the transparent thermoplastic polymer film covered with the abrasive coating.

More precisely, the present invention relates to a first process for manufacturing the ophthalmic lens, comprising:
 A. the provision of a transparent ophthalmic lens substrate made of organic glass;
 B. the provision of an adhesive multilayer film consisting of a transparent thermoplastic polymer film, coated on one of its two faces with an abrasion-resistant coating and on the other face with an adhesive layer;
 C. the contacting of the adhesive layer of the adhesive multilayer film with the organic substrate; and
 D. the application of uniform pressure over the entire contact zone so as to make the adhesive multilayer film adhere to the transparent organic substrate.

The present invention also relates to a second process for manufacturing the ophthalmic lens according to the invention, comprising:
 a. the provision of a transparent ophthalmic lens substrate, made of organic glass, covered on at least one of its faces with an adhesive layer;
 b. the provision of at least one multilayer film consisting of a transparent thermoplastic polymer film, coated on one of its two faces with an abrasion-resistant coating;
 c. the contacting of the transparent thermoplastic polymer film of the multilayer film with the adhesive layer on the transparent organic glass substrate; and
 d. the application of uniform pressure over the entire contact zone so as to make the multilayer film adhere to the transparent organic substrate.

The final subject of the present invention is the use of a multilayer film consisting of a transparent thermoplastic polymer film, an abrasion-resistant coating, covering one of the faces of the transparent thermoplastic polymer film, and an adhesive layer covering the other face, to improve the impact strength of an ophthalmic lens to which said film is bonded.

The present invention relates more particularly to the use of a multilayer film consisting of a transparent thermoplastic polymer film, an abrasion-resistant coating, covering one of the faces of the transparent thermoplastic polymer film, and an adhesive layer covering the other face, to improve the impact strength of an ophthalmic lens to which said film is bonded, said ophthalmic lens being an ophthalmic lens having a minimum thickness at the centre of less than 2 mm, preferably less than 1.5 mm and even more preferably less than 1.2 mm.

Documents FR 2 902 105, FR 2 897 693 and WO 97/35216 do not relate to a very thin ophthalmic lens as defined according to the invention and consequently in no way disclose the use of a multilayer film consisting of a transparent thermoplastic polymer film, an abrasion-resistant coating, covering one of the faces of the transparent thermoplastic polymer film, and an adhesive layer covering the other face, to improve the impact strength of an ophthalmic lens to which said film is bonded.

The organic substrate of the ophthalmic lens of the present invention can be any organic substrate commonly used in the ophthalmic field.

As examples, substrates made of the following materials may be mentioned: polycarbonate, polyamide, polyimide, polysulfone, polyethylene terephthalate/polycarbonate copolymers, polyolefins, especially polynorbornene, diethylene glycol bis(allylcarbonate) homopolymers and copolymers, (meth)acrylic polymers and copolymers, especially (meth)acrylic polymers and copolymers derived from bisphenol-A, thio(meth)acrylic polymers and copolymers, polyurethane and polythiourethane homopolymers or copolymers, epoxy copolymers and polymers and episulfide polymers and copolymers.

The organic substrate may be subjected, before application or contact with the adhesive layer, to a physical surface treatment, for example of the corona or plasma or chemical type, generally intended to improve the adhesion.

The multilayer film, or impact-resistant film, bonded in the present invention via an adhesive layer to the organic glass substrate, consists of
- a layer formed from a transparent thermoplastic polymer; and
- an abrasion-resistant layer deposited on one of the faces of the thermoplastic layer.

The thermoplastic polymer must be a transparent polymer, that is to say a polymer having a light scattering of less than 0.5%, preferably between 0.2 and 0.3%, and a transmission factor of at least 90%, preferably between 93% and 98% (these scattering and transmission factor measurements are carried out according to the ASTM D1003 standard on a Hazeguard instrument).

Its glass transition temperature is above the use temperature of the optical article, which is usually room temperature. It is generally between 50° C. and 250° C., preferably between 70 and 200° C. At the use temperature, the thermoplastic polymer film is therefore not in the plastic state but in the glassy, rigid and brittle state.

It will be preferred to use as a transparent thermoplastic film for implementing the present invention, a polyethylene terephthalate film having a glass transition temperature ($T_g$), measured by DMA (dynamic mechanical analysis), of between 50° C. and 150° C. or a cellulose triacetate film having a $T_g$ of between 100 and 180° C.

The thickness of this thermoplastic polymer film is preferably between 50 μm and 150 μm, in particular between 60 μm and 100 μm.

This polymer film is coated on one of its faces with an abrasion-resistant coating known as such. It is preferably an abrasion-resistant coating of the nanocomposite varnish type based on silica dispersed in an organic matrix. Such varnishes are described in detail, for example in the patents U.S. Pat. No. 5,619,288 and EP 0 614 957 and in international patent application WO 02/00561. Among the abrasion-resistant coatings employed in the context of the invention, coatings obtained from epoxyalkylalkoxysilanes, such as γ-glycidoxypropyltrimethoxysilane (GLYMO), and from alkylalkoxysilanes, such as dimethyldiethoxysilane (DMDES), or from hydrolysates of these compounds together with a catalyst, such as aluminium acetylacetonate, should be noted. Preferably, the abrasion-resistant coating also contains a colloidal binder, such as a metal oxide or silica.

This abrasion-resistant coating may be applied using known processes, for example by spin coating, by dip coating, by bar coating or by spray coating.

The thickness of the abrasion-resistant coating is similar to that of the known abrasion-resistant coatings and is generally between 1 and 15 μm, preferably between 2 and 10 μm.

In one of the two processes for manufacturing the ophthalmic lens of the present invention, the thermoplastic polymer film receives, on its face on the opposite side from that bearing the abrasion-resistant coating, a thin adhesive layer.

Various families of adhesives may be used in the context of the invention, these adhesives preferably have an elastic modulus, or Young's modulus, of less than that of the substrate and less than that of the thermoplastic film. In general, the adhesive has an elastic modulus at room temperature of between $10^3$ and $10^7$ Pa (pascals). Among adhesives that are particularly suitable for the invention, PSAs (pressure-sensitive adhesives) and HMAs (hot-melt adhesives) may especially be mentioned.

The term "PSA" is understood to mean a dry-contact adhesive, generally of viscoelastic nature, which requires only slight pressure to adhere to the contact surface. PSAs are characterized by the fact that they require no activation by water, by a solvent or by heating in order for them then to adhere permanently to a contact surface.

Advantageously, the pressure-sensitive adhesive (PSA) used is chosen from the group formed by a polyacrylate-based compound, a styrene-based block copolymer and a mixture containing a natural rubber. More particularly, the following may be mentioned as non-limiting examples: PSAs of general compositions based on polyacrylates, polymethacrylates or ethylenic copolymers, such as ethylene/vinyl acetate, ethylene/ethyl acrylate and ethylene/ethyl methacrylate copolymers; PSAs based on synthetic rubber and elastomers, including silicones, polyurethanes, styrene-butadienes, polybutadienes, polyisoprenes, polypropylenes and polyisobutylenes; PSAs based on polymers comprising nitriles or acrylonitriles; PSAs based on polychloroprene; PSAs based on block copolymers comprising polystyrene, polyethylene, polypropylene, polyisoprene or polybutadiene blocks; and blends of these polymers.

The PSAs may also contain one or more additives, especially chosen from tackifiers, plasticizers, binders, antioxidants, stabilizers, pigments, dyes, dispersants and scattering agents. Preferably, in the context of the invention, a polyacrylate-based PSA will be used.

For the application envisaged in the present invention, it is important to choose the PSA such that the transparency of the optical article obtained is not undesirably reduced. The PSA layer may of course have a hazy appearance before application to the organic substrate, but this haze must disappear after bonding.

The peel force (90° peel test) may vary between 10 and 25 N/25 mm.

The commercially available PSAs appropriate for the use as adhesive in the present invention are PSAs of optical quality, these also being very widely used in the field of display screens. Examples that may be mentioned include products sold by Nitto Denko, such as the PSA CS 9621, or the adhesive 3M 8141 sold by 3M.

The PSA layer may be applied to the thermoplastic polymer film before or after applying the abrasion-resistant coating, but is preferably applied thereafter. The PSA layer may optionally be protected by a release layer which will be debonded directly before the process is carried out.

It is also possible in the context of the invention to use an HMA (hot-melt adhesive). The term "hot-melt adhesive" encompasses conventional HMAs that can melt and harden a large number of times, but also reactive HMAs that are applied like conventional HMAs, but which cross link and thus form permanent adhesive bonds that it is impossible to melt again.

Hot-melt adhesives of optical quality are preferably polyurethane-based adhesives taking the form of aqueous dispersions of high-molecular-weight polyurethanes. Bayer sells two appropriate hot-melt adhesives under the names Dispercoll® U 42 and KA-8758. Bond Polymers International LLC also provides two hot-melt adhesives in the form of aqueous polyurethane dispersions under the references Bondthane® UD-104 and Bondthane® UD-108.

These aqueous dispersions may be mixed, before application, with additives intended to modify their rheological, mechanical or optical properties. Thus, the addition of a colloidal silica increases both hardness and durability.

The thermoplastic polymers may be chosen from polyolefins, polyamides, polyurethanes, polyurethaneureas, polyvinylpyrrolidones, polyesters, polyesteramides, polyoxazolines, and systems based on acrylic polymers. Polyolefins suitable as appropriate hot-melt adhesives are described for example in the U.S. Pat. No. 5,128,388. In particular, polyolefins chosen from copolymers having elastomeric blocks, such as those comprising polystyrene and polybutadiene or polyisoprene blocks or ethylene butylene block copolymers are preferred.

The thickness of the adhesive layer is generally between 10 and 50 µm, preferably between 15 and 30 µm.

The transparent organic glass substrate and the impact-resistant multilayer film are then bonded together in steps C and D (first process) or in steps c and d (second process). These bonding steps are preferably preceded by a step of thermoforming the multilayer film at a temperature below the glass transition temperature of the thermoplastic polymer. The purpose of the thermoforming step is essentially to give the multilayer film a form similar to that of the surface to which it will be bonded, so as to avoid strains, folds or damage of the multilayer film during the bonding step. The thermoforming temperature is preferably at least 10° C. below the glass transition temperature.

The thermoforming of the impact-resistant multilayer film and the bonding thereof on the organic glass substrate may be carried out using techniques known in the art. Examples of such processes that may be mentioned may be those described in detail in the patent EP 2 018 262 and the patent application WO 2006/105999 both in the name of the Applicant.

The multilayer film is advantageously deposited on both faces of the organic substrate, that is to say on the rear face and the front face of the lens.

The examples below show that, in terms of impact resistance of the finished lenses obtained, the benefit of bonding the impact-resistant film according to the invention is particularly spectacular when the film is bonded to the convex face (generally the front face) of an ophthalmic lens. The bonding of the impact-resistant film only to the front surface of the lens, which is preferably a convex face, consequently constitutes one particularly preferred embodiment of the process.

EXAMPLE

Organic Substrate

Organic lenses made of polythiourethane having a refractive index of 1.67 (Stylis® sold by Essilor), with a −1.50 dioptre power and a thickness at the centre of 0.9 mm or 1.1 mm were used. These lenses were subjected, before application of the multilayer films, to oxygen plasma surface treatment under reduced pressure.

Impact-resistant Multilayer Films

The following were used as transparent thermoplastic films:

a film made of cellulose triacetate (FT TD 80SL sold by Fuji) with a thickness of 80 µm and a glass transition temperature, determined by DMA, of 170° C.; or a film made of polyethylene terephthalate (U34® sold by Toray Co.) with a thickness of 75 µm (119° C. glass transition temperature determined by DMA).

An abrasion-resistant coating with a thickness of 4 µm was deposited on these films by spin coating, which coating was then crosslinked by heating for 3 hours at 100° C. The abrasion-resistant coating was obtained according to example 3 of the patent EP 0 614 957 B1. This coating comprised, relative to the total weight of the composition, 22% glycidoxypropylmethyldimethoxysilane, 62% colloidal silica, contained at 30% concentration in methanol, and 0.70% aluminium acetylacetonate.

An acrylic PSA (Nitto CS9621) layer was then applied with a thickness of about 25 µm to the opposite face of the films thus obtained.

The three-layer film was then thermoformed at a temperature of about 100° C. so as to give it the shape of the surface to which it will be bonded.

Bonding

The multilayer films were bonded to the organic glass lenses by means of the process described in WO 2006/105999 by applying a uniform pressure of about 0.03 MPa via a deformable pad.

The lenses thus obtained were then machined using a 6E National Optronics edger and cut into the form of a disc 50 mm in diameter.

Evaluation of the Impact Strength

The impact strength of the lenses was evaluated using the ANSI Standard Z 80.1 standard (1987) by dropping an impacter onto the centre of the convex face of each lens. The variation in acceleration of the impacter upon contact with the lens enabled the fracture energy of the lens to be determined For each lens series (n=20-40), the mean fracture energy $FE_{mean}$ (in mJ) and the minimum fracture energy $FE_{min}$ were determined.

For comparison, the impact strength of ophthalmic lenses having received a conventional impact-resistant coating, applied by dip coating on both lens faces, was also evaluated. The conventional impact-resistant coating consisted of a latex-based primer (2 µm thick) covered with an abrasion-resistant coating identical to that of the examples according to the invention, with a thickness of 4 µm. The latex used was obtained according to the protocol described in example 1 of the U.S. Pat. No. 5,316,791 using, as substrate, W-240, which is an aqueous polyurethane dispersion sold by Baxenden. This primer was deposited by dip coating and then crosslinked at 85° C. for 4 minutes.

The following table indicates:

the thickness at the centre of the bare substrate ($T_{bare}$) expressed in mm;

the impact-resistant film (or coating for the comparative trials);

the thickness at the centre with the impact-resistant film or films (or coatings) ($T_{final}$) expressed in mm;

the number (n) of lenses tested for each series;

the mean fracture energy ($FE_{mean}$) expressed in mJ;

the minimum fracture energy ($FE_{min}$) expressed in mJ; and the number of lenses not broken.

TABLE

| | $T_{bare}$ | Impact-resistant coating | $T_{final}$ | n | $FE_{mean}$ | $FE_{min}$ | not broken |
|---|---|---|---|---|---|---|---|
| Comp. Ex. 1 | 0.9 | Latex primer + abrasion-resistant layer | 0.9 | 38 | 841 | 477 | 0 |

TABLE-continued

| | $T_{bare}$ | Impact-resistant coating | $T_{final}$ | n | $FE_{mean}$ | $FE_{min}$ | not broken |
|---|---|---|---|---|---|---|---|
| Comp. Ex. 1 | 1.1 | Latex primer + abrasion-resistant layer (cx-cc) | 1.1 | 38 | 644 | 426 | 0 |
| Ex. 1 | 0.9 | TAC film + abrasion-resistant layer (cx-cc) | 1.1 | 37 | 2136 | 1723 | 0 |
| Ex. 2 | 1.1 | TAC film + abrasion-resistant layer (cx-cc) | 1.3 | 37 | 2023 | 1596 | 0 |
| Ex. 3 | 1.1 | TAC film + abrasion-resistant layer (cx) | 1.2 | 30 | 5300 | 1921 | 12 |
| Ex. 4 | 1.1 | TAC film + abrasion-resistant layer (cc) | 1.2 | 30 | 2005 | 1272 | 0 |
| Ex. 5 | 0.9 | PET film + abrasion-resistant layer (cx-cc) | 1.1 | 33 | >6263 | 4477 | 30 |
| Ex. 6 | 1.1 | PET film + abrasion-resistant layer (cx-cc) | 1.3 | 20 | >6296 | 5956 | 16 |

(cx-cc) = deposited on the convex face and the concave face of the lens;
(cx) = deposited on only the convex face;
(cc) = deposited on only the concave face.

The table shows that the mean energy required to fracture the lenses according to the prior art (comparative examples 1 and 2) is about 750 mJ, the difference between the two specimens of different thickness being considered as not significant.

When the lenses bear, on each of their faces, an impact-resistant multilayer film according to the invention based on a cellulose triacetate film (Examples 1 and 2), the mean fracture energy increases considerably. It is almost three times higher, whereas the final lenses are barely thicker than those of comparative examples 1 and 2.

Examples 3 and 4 make it possible to understand that the contribution to the impact strength of the coatings applied to the convex and concave faces of the lens is not the same. This is because, all other conditions being the same, the presence of an impact-resistant multilayer film on the convex face of the lens makes it possible to obtain a mean fracture energy more than twice as high as that of an identical film applied on the concave face. Twelve lenses out of thirty resisted fracture by the impacter.

Finally, Examples 5 and 6 show that PET-based multilayer films make it possible to obtain lenses having a very high impact strength, only 7 lenses out of 53 breaking under the impact.

The invention claimed is:
1. Ophthalmic lens comprising:
a transparent ophthalmic lens substrate made of organic glass;
an adhesive layer covering at least one of the faces of the transparent substrate;
a transparent film made of a thermoplastic polymer fixed to the transparent substrate via the adhesive layer; and
an abrasion-resistant coating covering the transparent thermoplastic polymer film,
wherein a first face of the substrate is covered first with the adhesive layer, second with the transparent thermoplastic polymer film, and third with the abrasion-resistant coating covering the transparent thermoplastic polymer film, and
wherein at the center, an overall thickness of the ophthalmic lens is less than 2 mm.

2. Ophthalmic lens according to claim 1, wherein the thermoplastic polymer forming the transparent film has a glass transition temperature, measured by dynamic mechanical analysis, of between 50° C. and 250° C.

3. Ophthalmic lens according to claim 1, wherein the thermoplastic polymer forming the transparent film is chosen from cellulose triacetate (TAC) and polyethylene terephthalate (PET).

4. Ophthalmic lens according to claim 1, wherein the adhesive layer is a pressure-sensitive adhesive layer or a hot-melt adhesive layer.

5. Ophthalmic lens according to claim 1, wherein the transparent thermoplastic polymer film has a thickness of between 50 μm and 150 μm.

6. Ophthalmic lens according to claim 1, wherein the abrasion-resistant coating has a thickness of between 1 and 15 μm.

7. Ophthalmic lens according to claim 1, wherein the thickness of the adhesive layer is between 10 and 40 μm.

8. Ophthalmic lens according to claim 1, wherein only one face of the substrate is covered with an adhesive layer, with a transparent thermoplastic polymer film and with an abrasion-resistant coating covering the transparent thermoplastic polymer film.

9. Process for manufacturing an ophthalmic lens according to claim 1, comprising the sequential steps of:
A. the provision of a transparent substrate made of organic glass;
B. providing an abrasion-resistant coating on a first of two faces of a transparent thermoplastic polymer film, and applying an adhesive layer coating on a second of the two faces of the transparent thermoplastic polymer film to thereby provide an adhesive multilayer film consisting of i) the transparent thermoplastic polymer film with the two faces, ii) the abrasion-resistant coating coated on the first of the two faces of the transparent thermoplastic polymer film, and iii) the adhesive layer coating the second of the two faces of the transparent thermoplastic polymer film;
C. the contacting of the adhesive layer of the adhesive multilayer film with the organic substrate; and
D. the application of uniform pressure over the entire contact zone so as to make the multilayer film adhere to the transparent organic substrate.

10. Process for manufacturing an ophthalmic lens according to claim 1, comprising:
a. the provision of a transparent ophthalmic lens substrate, made of organic glass, covered on at least one of its faces with an adhesive layer;
b. the provision of a multilayer film consisting of a transparent thermoplastic polymer film having opposite first and second faces, the multilayer film coated on the first face with an abrasion-resistant coating;
c. the contacting of the second face of the transparent thermoplastic polymer film of the multilayer film with the adhesive layer on the transparent organic glass substrate; and
d. the application of uniform pressure over the entire contact zone so as to make the multilayer film adhere to the transparent organic substrate.

11. Method of improving the impact strength of an ophthalmic lens, which method comprises:
bonding a multilayer film to the ophthalmic lens, the multilayer film consisting of a transparent thermoplastic polymer film with opposite first and second faces, an abrasion-resistant coating covering the first face of the transparent thermoplastic polymer film, and an adhesive layer covering the second face, thereby improving the impact strength of the ophthalmic lens to which said film is bonded, wherein at the center, an overall thickness of the ophthalmic lens is less than 2 mm.

12. Process for manufacturing an ophthalmic lens according to claim 9, wherein the transparent substrate is an ophthalmic lens substrate.

13. Ophthalmic lens, comprising:
a transparent ophthalmic lens substrate made of organic glass, the transparent ophthalmic lens substrate having a first face and a second face;
a first adhesive layer having a first face and a second face, the first face of the first adhesive layer contacting the first face of the transparent substrate;
a first transparent thermoplastic polymer film having a first face and a second face, the first face of the first transparent film contacting the second face of the first adhesive layer; and
a first abrasion-resistant coating having a first face contacting the second face of the first transparent thermoplastic polymer film,
wherein at the center, an overall thickness of the ophthalmic lens is less than 2 mm.

14. Ophthalmic lens of claim 13, further comprising:
a second adhesive layer having a first face and a second face, the first face of the second adhesive layer contacting the second face of the transparent substrate;
a second transparent thermoplastic polymer film having a first face and a second face, the first face of the second transparent film contacting the second face of the second adhesive layer; and
a second abrasion-resistant coating having a first face contacting the second face of the second transparent thermoplastic polymer film.

15. Ophthalmic lens of claim 13, wherein the first adhesive layer is a pressure-sensitive adhesive layer.

16. Ophthalmic lens of claim 13, wherein the wherein the first adhesive layer is a hot-melt adhesive layer.

17. Ophthalmic lens of claim 1, wherein the adhesive layer is a pressure-sensitive adhesive layer.

18. Ophthalmic lens of claim 1, wherein the wherein the adhesive layer is a hot-melt adhesive layer.

* * * * *